No. 671,315. Patented Apr. 2, 1901.
T. A. EDISON.
CONVEYER.
(Application filed June 29, 1897.)
(No Model.)
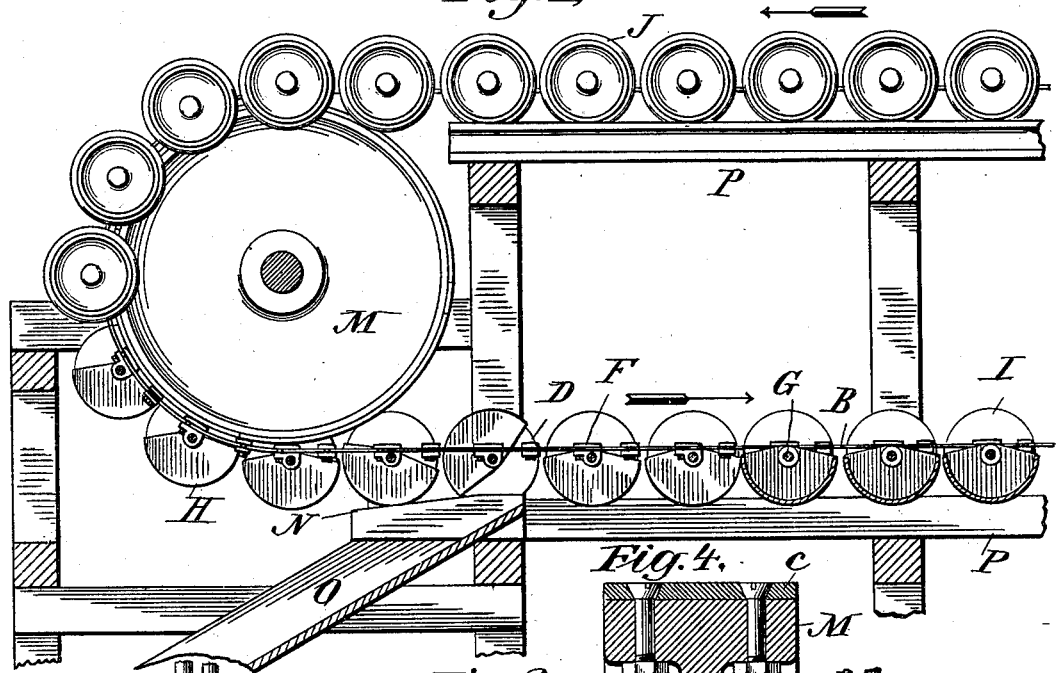
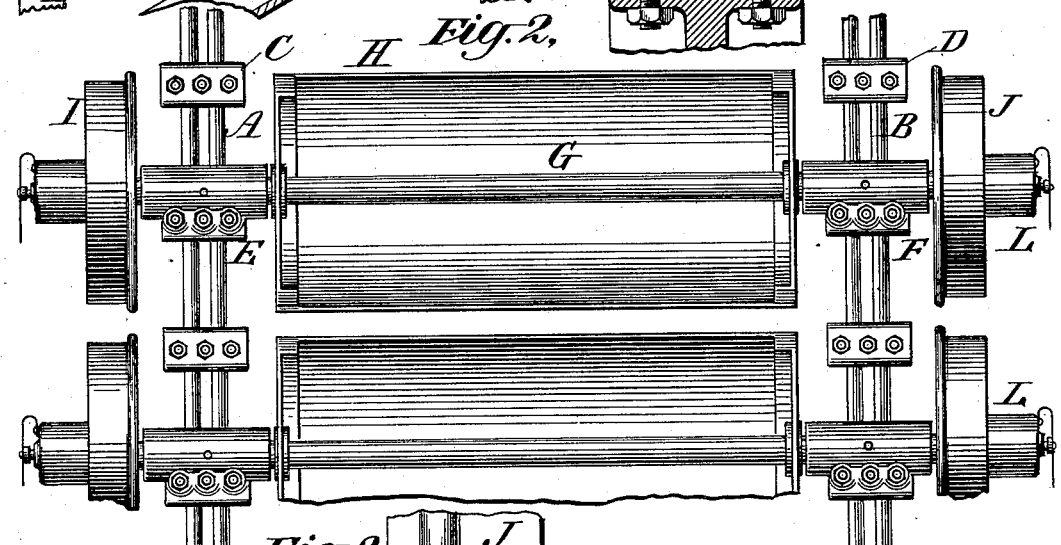
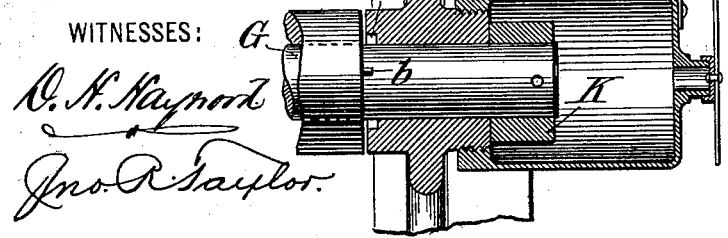
WITNESSES:
INVENTOR
Thomas A Edison
BY
Dyer & Driscoll
ATTORNEYS

UNITED STATES PATENT OFFICE.

THOMAS A. EDISON, OF LLEWELLYN PARK, NEW JERSEY.

CONVEYER.

SPECIFICATION forming part of Letters Patent No. 671,315, dated April 2, 1901.

Application filed June 29, 1897. Serial No. 642,816. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Conveyers, (Case No. 984,) of which the following is a specification.

The object I have in view is to produce a swinging bucket conveyer which will be simple in construction, efficient in operation, and will be capable of carrying heavy loads with a minimum wear.

In carrying out my invention I mount the swinging buckets between two sets of endless wire ropes, each set being composed of two or more ropes. The ropes of each set are held together by flat clamps, which pass over smooth pulleys, whose faces have a width not greater than the clamps. The smooth pulleys are faced with wearing-surfaces of soft iron, and the clamps are made of mild steel, the clamps acting as friction-shoes in passing over the pulleys. The buckets are preferably of U shape in cross-section and are hung on rods which pass through the clamps on the two sets of ropes. The ropes are also preferably provided with clamps intermediate the bucket-clamps, so as to provide additional surfaces to bear on the smooth pulleys. Between the smooth pulleys, at the ends of the conveyer, the buckets are supported by rails, upon which ride wheels carried by the rods upon which the buckets are swung. These wheels are lubricated by oil-cups screwed on the hubs of the wheels on their outer sides and covering the ends of the bucket-rods. The inner sides of these hubs are grooved next to the journals, and in these grooves project pins which act to periodically displace the dust-cap and permit the renewal of the oil in the bearing. The advantages of this construction are numerous. Besides the economy of construction the employment of wire ropes instead of chains, as is now customary, effects a great saving in operation, since there is little or no wear. I have found that by employing steel-wire ropes and clamping them together in sets, as will be explained, so as to connect the buckets by what are substantially flexible belts, they may be passed over smooth wheels and be driven by friction under all the conditions of load and speed required by actual practice.

In the drawings, Figure 1 is an elevation and partial section of the conveyer at one end. Fig. 2 is a top view of a portion of the conveyer. Fig. 3 is a sectional view showing the means for oiling the wheels, and Fig. 4 is a section of the rim of one of the driving-pulleys.

A B are the two sets of endless ropes, each set being composed of two or more ropes. The ropes of each set are clamped together at intervals by clamp-plates C D. Between the clamp-plates C D are other clamp-plates E F, through which pass rods G, upon which the U-shaped buckets H are swung. The rods G extend beyond the clamps E F and have mounted on their ends wheels I J. The wheels are secured on the rods by suitable collars K. Each end of each rod G and the collar K, attached thereto, are covered by an oil-cup L, which is screwed onto the hub of the wheel J. The hub of the wheel J is provided with a groove $a$ at its inner end next to the journal, and in this groove plays a pin $b$, which acts to mix the dust and oil and to periodically detach the dust-cap in accordance with the principle described in my case, Serial No. 642,815. At the ends of the conveyer the wire ropes pass over smooth pulleys M, which are faced with soft-iron plates $c$. The flat clamps bear on the smooth faces of these pulleys and furnish the required tractive effect.

The buckets may be dumped in any suitable way, as by an inclined friction-surface N, which rolls them over and causes them to discharge their contents into a chute O. I make no claim to this special device. The wheels I J ride upon supporting-rails P at the top and bottom of the conveyer and between the smooth pulleys at the ends of the conveyer.

What I claim is—

1. In a bucket conveyer, the combination with two sets of endless ropes each composed of a plurality of ropes, of buckets swung between the sets of ropes, clamps upon the ropes, and smooth driving-pulleys upon which the clamps ride, substantially as set forth.

2. In a bucket conveyer, the combination with two sets of endless wire ropes and buckets swung between the sets of ropes, of clamps for securing the buckets between the sets of ropes, intermediate clamps upon the ropes, and smooth driving-pulleys, substantially as set forth.

3. In a bucket conveyer, the combination with two sets of endless ropes and a plurality of clamps thereon, of buckets swung between the sets of ropes, smooth driving-pulleys with which the clamps engage, and wheels and rails for carrying the conveyer between the driving-pulleys, substantially as set forth.

4. In a bucket conveyer, the combination with two sets of endless ropes and a plurality of clamps thereon, of buckets swung on rods passing through clamps on both sets of ropes, smooth driving-pulleys with which the clamps engage and lubricated wheels carried by the rods outside of the clamps, substantially as set forth.

5. In a bucket conveyer, the combination with the two sets of endless wire ropes, of the smooth-faced driving-pulleys, the intermediate supporting-rails, the buckets swung on rods extending through clamps on both sets of ropes, wheels on the ends of the bucket-rods riding on rails, and clamps on the ropes between the bucket-clamps, and which engage the said driving-pulleys, substantially as set forth.

This specification signed and witnessed this 10th day of June, 1897.

THOMAS A. EDISON.

Witnesses:
RICHARD N. DYER,
W. PELZER.